UNITED STATES PATENT OFFICE.

ORAZIO LUGO, OF NEW YORK, N. Y., ASSIGNOR TO THE ORALU MANUFACTURING COMPANY, OF CAMDEN, NEW JERSEY.

PURIFICATION OF COTTON-SEED OIL AND REAGENT USED THEREIN.

SPECIFICATION forming part of Letters Patent No. 596,411, dated December 28, 1897.

Application filed May 13, 1897. Serial No. 636,363. (No specimens.)

*To all whom it may concern:*

Be it known that I, ORAZIO LUGO, a citizen of the United States, residing at New York, in the county of New York and State of New York, have invented certain new and useful Improvements in the Purification of Cotton-Seed Oil and the Manufacture of a Chemical Reagent Used Therein, of which the following is a specification.

In an application for Letters Patent of the United States filed by me on the 21st day of April, 1897, Serial No. 633,360, I have described and claimed certain processes for chemically purifying oils and a reagent for treating and refining cotton-seed oil, and this my invention relates to an improvement thereon, as will hereinafter be more fully described and claimed.

The usual process of purifying crude cotton-seed oil consists in employing caustic-soda or caustic-potash solutions of a greater or less degree of strength, agitating the solution with the crude oil, heating the same to about 85° centigrade, and then separating the purified oil from the residuum ("foots" or soap-stock) either by decantation or filtration.

In the present invention I do not apply heat to the mixture of the oil and reagent either while being agitated or in the subsequent steps of the process, thus avoiding the danger of imparting to the oil any foreign taste or smell and reducing shrinkage to a minimum. On the other hand, in heating the oil in the presence of free-caustic-alkali solutions an excess of soap or of other substances are formed which are not necessary for the refining of crude oils and which consequently increase the loss of oil. To this end I use a new chemical reagent which, being agitated with the oil, produces a dark granular heavy precipitate easily separable from the clear oil by means of filtration or decantation. When the agitated mixture of the oil and my new chemical reagent is passed through a filtering-press, the oil will be found to be clear and bright, and the residuum retained on the cloths will not interfere with the oil passing through them freely, while the hard cake is readily removed from the cloths, which can be reused again.

The new composition or reagent herein referred to I produce or manufacture substantially as follows: The proportions that I prefer are thirty-seven (37) parts, by weight, of silicate of alumina and sixty-three (63) parts, by weight, of caustic soda or caustic potash. The soda and the silicate of alumina are preferably ground to a fine state, (either together or separately,) and then about fifty (50) parts, by weight, of water are added and thoroughly mixed therewith, producing a fine thin paste. This paste is then heated in iron vessels to a high temperature (about 400° Fahrenheit) until a solid porous cake is formed. After cooling the cake is finely comminuted, care being taken to prevent it from absorbing moisture.

When this composition is to be used for the purification of a prime crude cotton-seed oil, I take, for example, for every one hundred thousand (100,000) pounds of crude cotton-seed oil, say, five hundred (500) pounds of the dry and minutely-ground reagent and mix it thoroughly with about one thousand (1,000) pounds of water. Then I add it to the oil, agitating strongly the mixture for one hour or more or until the reagent shall have acted on every particle of the crude oil. When this action has taken place, which is indicated by the mixture becoming quite dark, the reaction is finished. The mixture is permitted to stand in tanks until the precipitate has settled at the bottom, and the clear supernatant oil is decanted, or it can be immediately passed through a filtering-press. By the former operations the crude oil is brought into such a condition by the agitation that it can be filtered without the slightest inconvenience or difficulty, for the reasons above stated.

The cost of the new composition is much less than that of the chemicals now in use. The quantity or percentage required to purify the crude oil being very small, the ultimate shrinkage is greatly reduced. The oil purified is of a prime quality in color, taste, and smell.

It will be understood that I do not limit myself to either the temperature of the oil treated or the percentage of the composition. It is advisable, however, to make a laboratory test of the oil to determine the correct quantity of the reagent necessary to be used prior to treating the oil on a large scale.

Having thus described my invention, what I claim as new, and desire to secure by Letters Patent, is—

1. The process of purifying crude cotton-seed oil which consists in treating the oil with the herein-described chemical reagent composed of silicate of alumina and a caustic alkali, agitating the mixture and separating the oil from the residuum without heating the same, substantially as described.

2. A chemical reagent substantially as described for the purposes herein set forth, which consists in the mixture of a silicate of alumina, a caustic alkali (soda or potash) with water, heated and pulverized all substantially in the manner herein described.

In testimony whereof I affix my signature in presence of two witnesses.

ORAZIO LUGO.

Witnesses:
EDWIN W. PRESTON,
WM. LONGSTRETH.